July 12, 1960 D. A. CLARK 2,944,615
SUPPORT AND TRANSPORTING STRUCTURE FOR HARROWS
Filed March 26, 1956 4 Sheets-Sheet 1
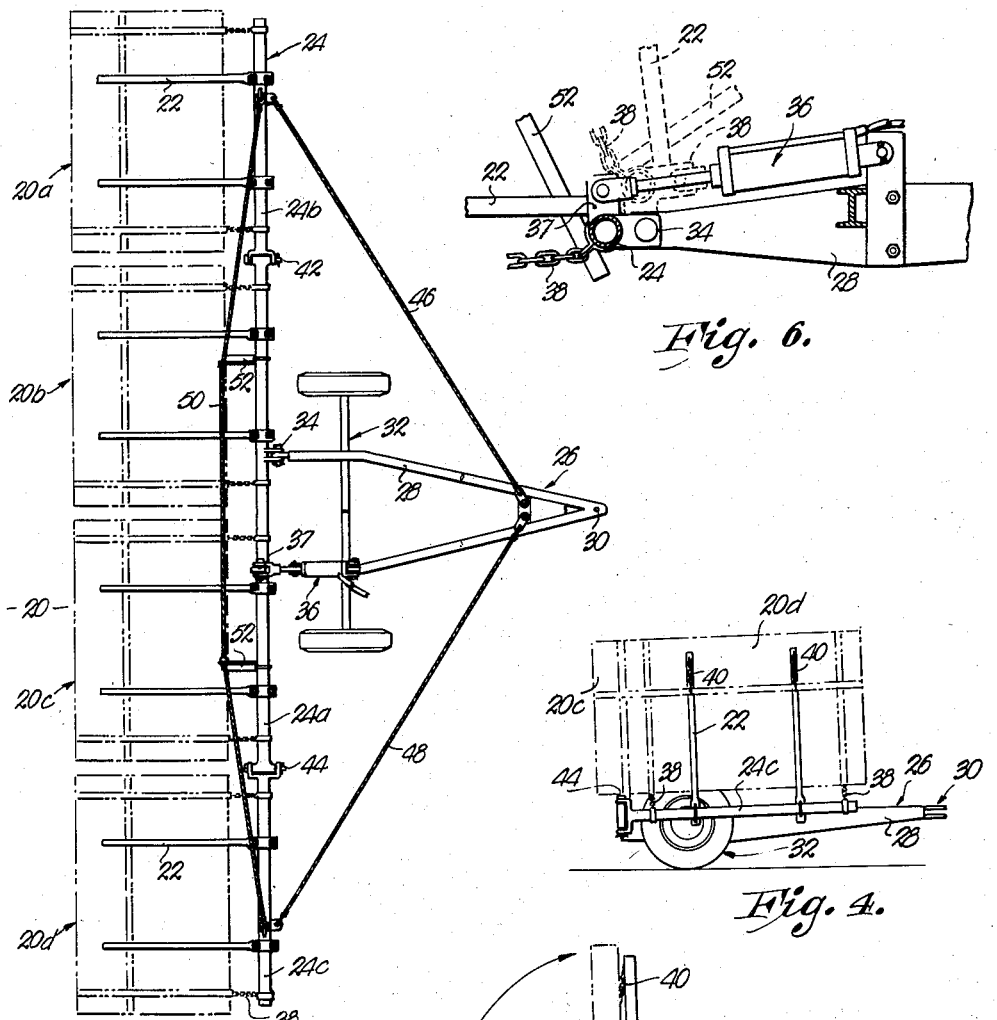
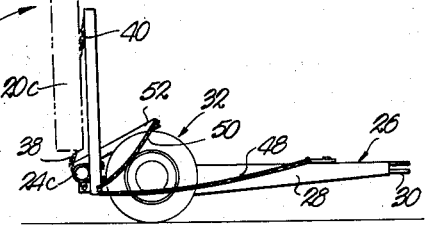
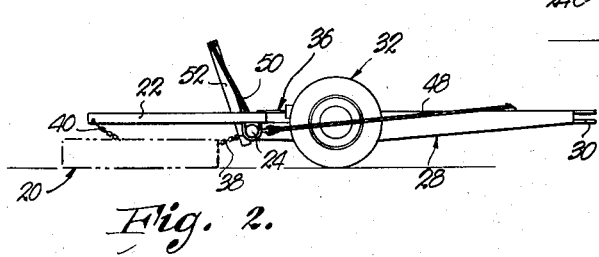
INVENTOR.
David A. Clark
BY
ATTORNEY.

July 12, 1960 D. A. CLARK 2,944,615
SUPPORT AND TRANSPORTING STRUCTURE FOR HARROWS
Filed March 26, 1956 4 Sheets-Sheet 2
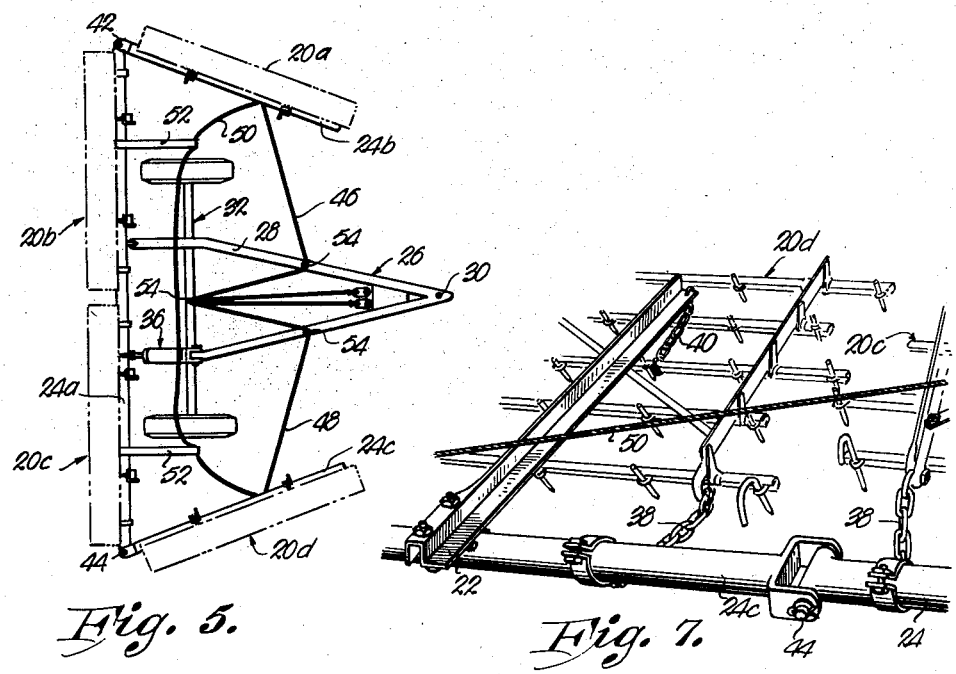
Fig. 5.
Fig. 7.
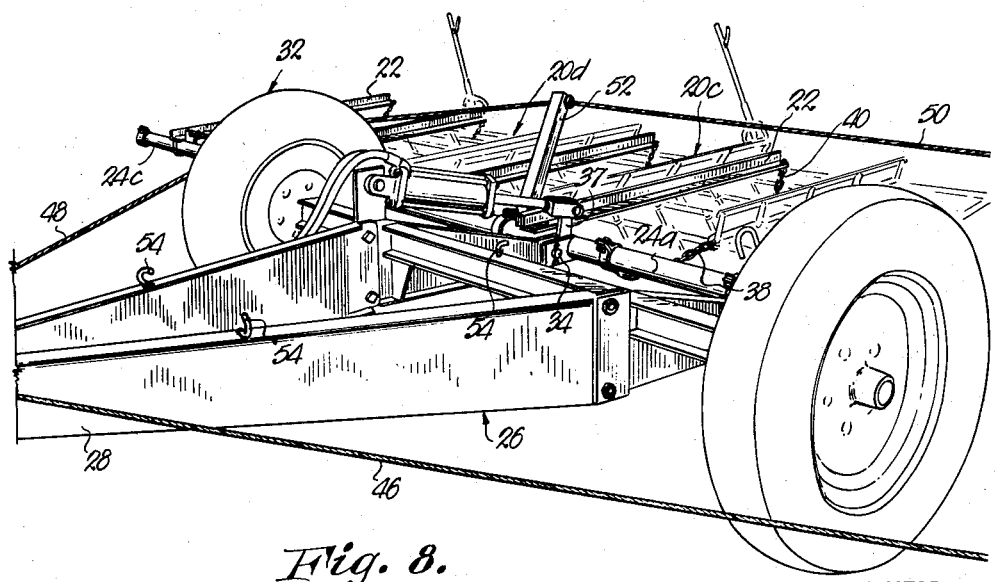
Fig. 8.
INVENTOR.
David A. Clark
BY
ATTORNEY.

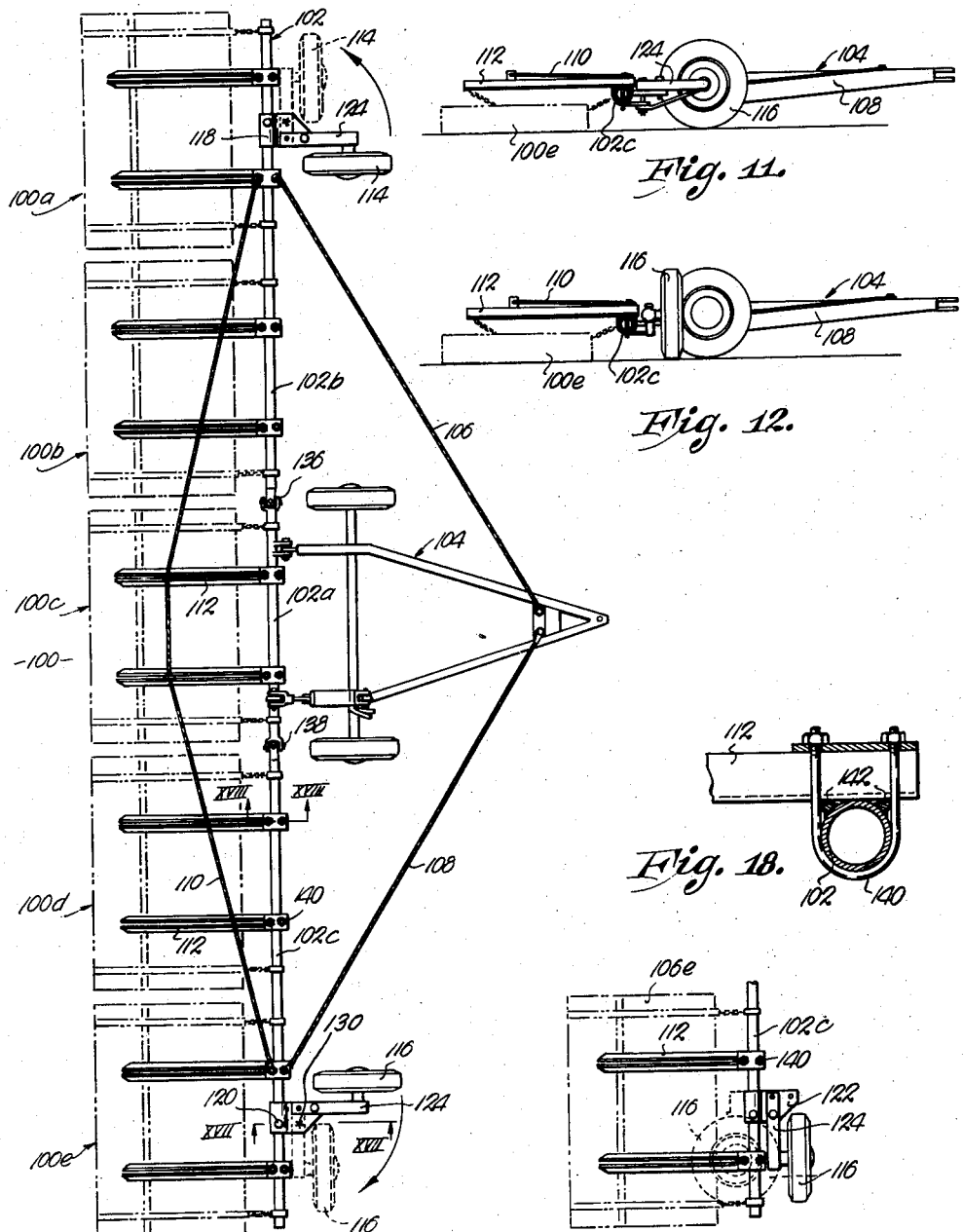

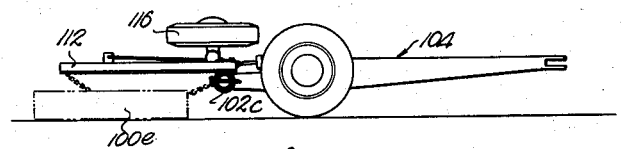
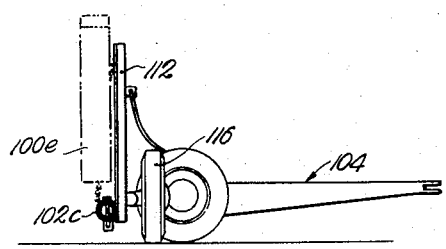
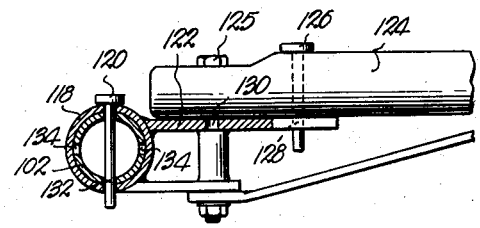
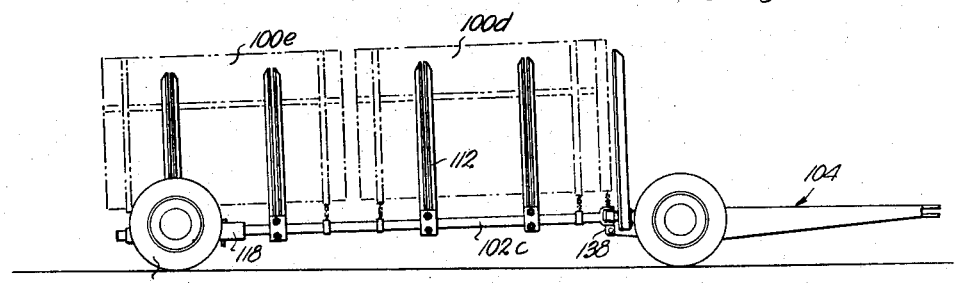
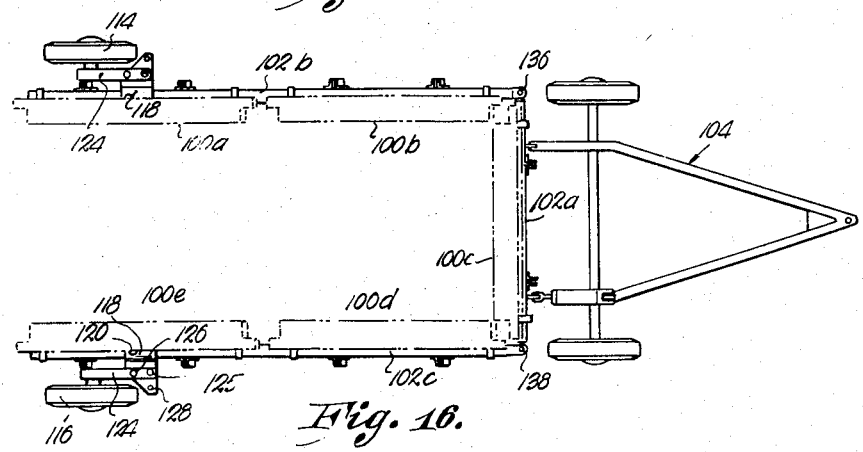

United States Patent Office 2,944,615
Patented July 12, 1960

2,944,615
SUPPORT AND TRANSPORTING STRUCTURE
FOR HARROWS

David A. Clark, Atherton, Mo., assignor to Clark Manufacturing Company, Atherton, Mo., a partnership Filed Mar. 26, 1956, Ser. No. 573,675
2 Claims. (Cl. 172—456)

This invention relates to the field of farm implements and more particularly to a support or carrier for implements of the kind that are normally difficult to handle and transport, as for example, ordinary spike-toothed types of sectional harrows.

It is the primary object of the instant invention to provide a carrier for sectional implements of the aforementioned character, that not only presents a draw bar connection for the sections in normal use, but which is capable of permitting raising and lowering of the implement to and from the normal operating position and which is additionally capable of permitting folding of the implement sections to a condition facilitating transportation thereof when the implement sections are raised to an upright condition.

It is the most important object of the present invention to provide carrier structure of the kind just above set forth that is capable of presenting all of such advantageous new end results without the necessity on the part of the operator to manually handle the implement sections or be subjected to the laborious tasks of lifting the sections as has heretofore been necessary in structures of the type to which the instant invention relates.

Another important object of the present invention is the provision of a carrier that makes it possible to quickly, easily and expeditiously raise and lower all the harrow sections simultaneously to any desired height between the horizontal and the vertical ends for any desired purpose such as clearing the implement of trash and rubbish collection, execution of turns, use in relatively confined areas, and maneuvering into desired positions for storage after disconnecting the carrier from the tractor or other towing medium.

It is still another important object of the present invention to provide a carrier having a unique draw bar or equalizing coupling member that is rotatable to swing the implement sections to various desired attitudes and is composed of a number of articulated lengths to the end that the lengths and the implement sections may be folded to a collapsed condition when raised to an upright position.

A further object of the instant invention is the provision of a carrier having novel hinge means for articulating the several lengths of the rotatable member aforementioned so arranged as to permit relative swinging movement of the implement sections as the same are placed in use over uneven terrain and having means for limiting such swinging movement during the raising step until vertically disposed whereupon the hinge means is employed to carry out the folding operation.

Many additional features of the present invention include the way in which the end lengths of the rotatable member are connected with the carrier to exert a pull thereon during normal use and operation; the manner of preventing sagging of the terminal ends of the rotatable equalizing member either through a cable connection with a central length that is in turn mounted on the carrier or through ground engaging wheels or the like; the manner of so interconnecting the various parts so as to remove excess strain during turning and backing operations; the manner of utilizing hydraulic or other power means for effecting the raising and lowering operations; the way in which the implement sections are connected so as to obviate undue downward movement thereof with respect to the carrier when raised to the upright position; the way in which the last mentioned connections are formed to permit relative movement between the implement sections and the carrier therefor; and the manner of providing novel wheel structure at the terminal ends of the carrier for support purposes not only during normal operation, but during transportation in the folded or collapsed condition also.

In the drawings:
Figure 1 is a plan view of a support and transporting structure for harrows made pursuant to one form of my present invention;
Fig. 2 is an end elevational view thereof;
Fig. 3 is a view similar to Fig. 2 showing the implement raised to an upright position;
Fig. 4 is a view similar to Figs. 2 and 3 but showing the carrier and the implement sections in a folded position;
Fig. 5 is a plan view illustrating the relative position of parts as shown in Fig. 4;
Fig. 6 is an enlarged fragmentary view partially in section illustrating the power means for raising and lowering the implement;
Fig. 7 is a fragmentary perspective view illustrating certain component parts and particularly one of the hinge joints;
Fig. 8 is a fragmentary perspective view showing particularly the trailer portion of the carrier;
Fig. 9 is a plan view depicting a modified form of the instant invention;
Fig. 10 is a fragmentary plan view of the embodiment of Fig. 9 showing one of the outermost supporting wheels and the manner of repositioning the same for transporting purposes;
Fig. 11 is an end view of the structure shown in Fig. 9;
Fig. 12 is a view similar to Fig. 11 illustrating the proximal supporting wheel swung to its first position when converting the same for transporting purposes;
Fig. 13 is a view similar to Figs. 11 and 12 showing the last-mentioned wheel in position ready for raising the implement;
Fig. 14 is a view similar to Figs. 11-13 but showing the implement raised;
Fig. 15 is a side-elevational view showing the structure of Fig. 9 in the folded transporting condition;
Fig. 16 is a plan view illustrating the component parts positioned as in Fig. 15;
Fig. 17 is an enlarged fragmentary cross-sectional view showing the operable connection for the terminal support wheels; and
Fig. 18 is an enlarged fragmentary cross-sectional view showing the connection between the arms and the draw bar members.

While the carrier about to be described is adaptable for many uses, particularly in the field of transporting and utilization of farm implements, there is illustrated in the embodiment shown in Figs. 1 to 8, inclusive, a conventional spike-toothed type of harrow broadly designated by the numeral 20 and including a plurality of initially separate sections 20a, 20b, 20c and 20d. Harrow 20 is operably connected to a plurality of lateral extensions or normally horizontal arms 22 which serve as support means for the harrow 20 when the same are raised from the normal horizontal operating position shown in Figs. 1 and 2 to an upright position as seen in Figs. 3-5.

The rearwardly extending, normally horizontal arms 22 that overlie the harrow 20 in Figs. 1 and 2 are attached directly to an elongated member 24 for rotation with the latter when the same is rotated on its normally horizontal longitudinal axis. The member 24 is carried by a suitable support and for such purpose there has been chosen for illustration a trailer-like mobile support or vehicle 26 having a chassis or frame means 28, a portion of which is formed and shaped to adapt the same for coupling with a tractor or other towing medium by virtue of coupling means 30. The frame 28 of the support 26 is in turn supported by a wheel and axle assembly 32.

Member 24 is sub-divided into a plurality of lengths and in the embodiment chosen for illustration there is provided a central length 24a and a pair of end lengths 24b and 24c. The length 24a is mounted on the support 26 and particularly on the rear end portions of frame 28 and hinge means 34, each of which is provided with a horizontal hinge pin as best seen in Figs. 1 and 8. The hydraulic piston and cylinder assembly 36 pivotally interconnecting the frame 28 and the length 24a through lateral projection 37 on the latter presents a simple and effective power means for effecting rotation of the member 24 and therefore swinging movement of the entire implement 20 from the position shown in Fig. 2 to that illustrated by Fig. 3.

Each of the sections of the harrow 20 are connected to the member 24 by pull chains 38, it being noted that length 24a thereby exerts a pull on the two sections 20b and 20c and that lengths 24b and 24c are associated with harrow sections 20a and 20d respectively.

The harrow 20 is also coupled with the arms 22, a pair of such arms 22 being provided for each harrow section respectively and the connection being in the nature of short chains 40. It can be seen that the flexible elements 38 and 40 afford freedom of movement of the harrow 20 with respect to the member 24 and the arms 22 in many directions, particularly in a vertical direction, to accommodate for unevenness in terrain, notwithstanding maintenance of the arms 22 in a predetermined set, substantially horizontal position. Attention is called to the fact that the flexible elements 40 extend downwardly and forwardly at an angle from the rearmost ends of the arms 22 when the harrow 20 is horizontally disposed as best seen in Figs. 2 and 7. By such special disposition of the chains 40, the harrow 20 may be raised to the upright position as seen in Fig. 3, for example, without any undue downward movement of the harrow 20 with respect to the arms 22. It can be seen in Fig. 3 that the chains 40 support the harrow 20 when the latter is raised in substantially the same position relative to the arms 22 as the harrow 20 is disposed when in the horizontal operating position.

The length 24a is connected with the length 24b of member 24 by hinge means that includes a hinge pin 42 that is in transverse relationship to the longitudinal axis of the member 24 and horizontally disposed in substantial alignment with the normal path of travel of the implement when in the normal horizontal operating position. Lengths 24a and 24c are similarly interconnected by hinge means that includes a normally horizontal hinge pin 44.

The said hinges and their pins 42 and 44 are protected during use by means interconnecting the lengths 24b and 24c with the frame 28 and preferably taking the form of flexible cables 46 and 48, respectively. It can be seen that when the vehicle 26 is placed in tow, the cables 46 and 48 limit the extent of rearward bending of the terminal ends of the member 24 since the cables 46 and 48 exerting pull on the lengths 24b and 24c.

By the same token, a reinforcing means, preferably in the nature of a flexible cable 50, is provided to prevent forward bending of the terminal ends of the member 24 during backing operations and during execution of turns. The cable 50 interconnects the lengths 24b and 24c and passes over lateral extensions 52 rigid to the length 24a.

The extensions 52 are disposed at an angle rearwardly and upwardly from the length 24a when the implement 20 is horizontally disposed to the end that the cable 50 serves the additional function of preventing undue sagging of the terminal ends of the member 24. However, neither of the cables 46—48 or 50 prevents the sections 20a and 20b from swinging upwardly with respect to the sections 20b and 20c and if the terrain is such as to cause such upward swinging movement the lengths 24b and 24c will readily swing upwardly about the axes of the normally horizontal hinge pins 42 and 44, respectively.

When it is desired to raise the harrow 20 for any purpose, it is but necessary to actuate the power means 36 thereby swinging the arms 22 upwardly and forwardly and raising the harrow 20 off the ground by virtue of the operable connection it is afforded through chains 38 and 40. When the harrow 20 is thus raised to any predetermined height, the carrier may be advanced, turned or reversed as desired during execution of turns. During maneuvering into confined corners or other spaces, manipulation to free the harrow 20 of trash and other collection and backing into corners or areas for storage, the supporting of the harrow 20 in an elevated position prevents any damage thereto and permits all the aforementioned movements.

If, on the other hand, it is desired to transport the harrow 20 over longer distances, particularly when not in use, it is possible through use of the power means 36 to swing the harrow 20 to the upright position shown in Fig. 3 with the arms 22 substantially vertical. This, of course, in turn swings the hinge pins 42 and 44 to a vertical position whereupon the outer end lengths 24b and 24c together with their harrow sections 20a and 20d, respectively, may be swung or folded to the position shown in Figs. 4 and 5. During such swinging movement the lengths 24b and 24c pivot about the now vertically disposed hinge pins 42 and 44 and, as seen in Fig. 5, the sections 20a and 20d may be moved to a relatively converging position. This, of course, appreciably narrows the overall length of the implement and the carrier, permitting transportation along roads and highways and through gates or other relatively narrow passages.

However, in order to hold the sections 20a and 20d in the position shown in Fig. 5, the cables 46 and 48 may be looped around a plurality of hooks 54 on the frame 28 in the manner illustrated by Fig. 5.

When the implement 20 is to be placed in use, it is a simple matter to release the cables 46 and 48 from the hooks 54, swing the sections 20a and 20d outwardly in alignment with the sections 20b and 20c, and thereupon actuate the power means 36 to lower the harrow 20. Manifestly, during the lowering operation, the cable 50 prevents undue downward swinging movement of the sections 20a and 20b with respect to the remaining parts of the implement 20.

In many respects the embodiment illustrated by Figs. 9 to 17, inclusive, is the same as the form of the invention just above described. Harrow 100 in this instance is composed of a larger number of sections 100a, 100b, 100c, 100d and 100e. However, it is but necessary to provide three lengths, 102a, 102b and 102c, for equalizing or draw bar member 102. The sections 100a and 100b are coupled with the length 102b, the section 100c is coupled with the length 102a and the sections 100d and 100e are coupled with the length 102c. The manner of connection through front and rear chains is the same as above set forth. Similarly, support 104 in the nature of a wheeled vehicle may be the same as in Figs. 1–9 and the manner of coupling the member 102 with the vehicle 104 as well as the means for actuating the same is the same in Figs. 9–17 as in Figs. 1–8. Cables 106 and 108 perform essentially the same function as cables 46 and 48. Similarly, cable 110 prevents forward bending of the outer lengths 102b and 102c. The cable 110 is connected with lateral extensions on the length 102a in a manner comparable with the extensions 52 but in Fig. 9 the connection of cable 110 with length 102a may be through a pair of arms 112 that serve to mount the harrow section 100c to the length 102a.

The cable 110 is not, however, utilized to prevent sagging of the terminal ends of lengths 102b and 102c; instead, there is provided a pair of ground-engaging wheels 114 and 116. These wheels are connected to the member 102 identically. To this end there is provided a short tube 118 rotatable on the member 102 and held against rotation by a removable pin 120. A flat plate 122 rigid to the tube 118 and normally extending forwardly therefrom swingably receives a short beam 124 through the medium of a hinge pin 125. It is seen that the wheels 114—116 are rotatably mounted on the terminal ends of the beams 124 and when a removable pin 126 is inserted in the beam 124 and through opening 128 in the plate 122, wheels 114 and 116 are held in proper relationship for normal forward and rearward movement of the entire unit.

When it is desired to raise the harrow 100 and fold the same to the condition shown in Figs. 15 and 16 for transportation purposes, pin 126 is first removed from the opening 128 and the arms 124 swung outwardly about the pivots 125 to the dotted line position shown in Fig. 9. Thereupon the pin 126 is reinserted through opening 130 in plate 122. It is now seen that the wheels 114 and 116 are at right angles to the normal operating position as seen in Fig. 10.

Thereupon the operator removes the pin 120 from aligned openings 132 in member 102 and swings the entire unit including the tube 118 about the longitudinal axis of the member 102 to position the wheels 114 and 116 in overlying relationship to the implement 100. Thereupon the pin 120 is reinserted through openings 134 in the member 102. Such new position of the wheels 114 and 116 is shown by dotted lines in Fig. 10 and is also illustrated in Fig. 13.

Thereupon, the implement 100 is raised to the upright position shown in Fig. 14 which again places the wheels 114 and 116 in engagement with the ground. Finally, it is but necessary to move the support 104 forwardly and the lengths 102b and 102c automatically swing to the positions shown by Figs. 15 and 16, provided that the cables 106 and 108 are first released from the member 102 and/or the vehicle 104. It is seen that the wheels 114 and 116 are now in proper relationship for supporting the terminal ends of the implement 100 during normal transportation.

The means for connecting the three lengths of member 102 in the embodiment shown by Figs. 9 to 17, inclusive, is in the nature of universal joints 136 and 138 which perform the same function as the hinges 42 and 44 so far as folding is concerned. However, the universal joints 136 and 138 also permit the wheels 114 and 116 to ride over rough terrain when the implement is folded as shown in Figs. 15 and 16. In other words, as the wheels 114 and 116 rise and fall, the lengths 102b and 102c are free to swing vertically with respect to the length 102a by virtue of the joints 136 and 138, notwithstanding the fact that the center length 102a is being held against rotation with respect to the trailer 104.

Fig. 18 of the drawing illustrates the way in which arms or extensions 112 are preferably mounted on the member 102 through U-bolts 140 together with lugs 142 on the member 102 which serve to prevent swinging movement of the arms 112 with respect to the member 102 when the U-bolts 140 are clamped in place.

When the unit is to be placed in use and changed from the position shown in Figs. 15 and 16 to that illustrated by Fig. 9, it is suggested that the pins 126 first be removed from the openings 130 to allow the wheels 114 and 116 to swing to a substantially 45° angle. The unit is thereupon removed in a reverse direction causing the wings to spread and align with the center section 100c of the harrow. The harrow 100 is thereupon lowered to the horizontal position and the wheels 114 and 116 are shifted to a position permitting reinsertion of the pins 126 into the openings 128. Pins 120 are thereupon removed, the tubes 118 rotated on the member 102, pins 120 reinserted into openings 132 and the cables 106 and 108 reattached as illustrated in Fig. 9.

It is apparent that all the advantages above set forth in describing the modification of Figs. 1-8 apply equally well to the modification of Figs. 9-17, inclusive, and need not be repeated.

Having thus described the invention, what is claimed as new and desired to be secured by Letters Patent is:

1. In an implement carrier, a mobile vehicle having a chassis; an elongated, horizontal drawbar member having a central length and a pair of end lengths; universal joints connecting the end lengths with the central length, permitting vertical and horizontal swinging movement of the end lengths relative to the central length; a plurality of normally horizontal arms secured to the member and extending laterally therefrom; a ground wheel supporting the terminal end of each end length respectively when the arms are horizonal; means for attaching an implement to the arms with the latter overlying the implement when the arms are horizontal; means mounting said central length on the chassis for rotation of the member about a horizontal axis to swing the arms and the implement attached thereto to a vertical position; and means attaching the wheels to the end lengths for movement to a position supporting the latter when the arms are vertical and said end lengths are swung to a transport position in angular relation to the central length, said means attaching the wheels each including a tube rotatable on the corresponding end length, a beam swingable on the tube, and means mounting the wheel for rotation on the beam.

2. The invention of claim 1, the beams being normal to the end lengths when the arms are horizontal and parallel to the end lengths when the arms are vertical.

References Cited in the file of this patent

UNITED STATES PATENTS

| | | |
|---|---|---|
| 417,466 | Bergendahl | Dec. 17, 1889 |
| 1,073,759 | Huck | Sept. 23, 1913 |
| 1,157,812 | Sharp | Oct. 26, 1915 |
| 1,484,622 | Claus | Feb. 26, 1924 |
| 1,927,458 | Klise | Sept. 19, 1933 |
| 2,095,417 | Messersmith et al. | Oct. 12, 1937 |
| 2,240,889 | Hench | May 6, 1941 |
| 2,591,028 | Udy | Apr. 1, 1952 |
| 2,619,016 | Dooley | Nov. 25, 1952 |
| 2,649,722 | Raught | Aug. 25, 1953 |
| 2,687,073 | Thorp | Aug. 24, 1954 |
| 2,706,880 | Steuerwald | Apr. 26, 1955 |
| 2,712,718 | Love | July 12, 1955 |
| 2,750,724 | Stephenson | June 19, 1956 |
| 2,800,758 | Schmied | July 30, 1957 |
| 2,828,597 | Moore | Apr. 1, 1958 |

FOREIGN PATENTS

| | | |
|---|---|---|
| 19,044 | Australia | Aug. 8, 1924 |
| 906,280 | France | May 14, 1945 |